United States Patent [19]

Kozak et al.

[11] Patent Number: 4,588,875
[45] Date of Patent: May 13, 1986

[54] MULTIPLE LOAD CONTROL APPARATUS WITH LOAD EQUALIZATION

[75] Inventors: Norman M. Kozak, Greendale, Wis.; Bernard R. Klinke, Mountlake Terrace, Wash.

[73] Assignee: A. O. Smith Corporation, Milwaukee, Wis.

[21] Appl. No.: 430,513

[22] Filed: Sep. 30, 1982

[51] Int. Cl.⁴ .............................................. H05B 1/02
[52] U.S. Cl. .................................. 219/485; 219/486; 219/501; 219/508; 219/328; 307/40
[58] Field of Search ............... 219/485, 327, 486, 328, 219/483, 501, 490–492, 507–510; 307/39–41; 323/235, 319

[56] References Cited

U.S. PATENT DOCUMENTS

| | | | |
|---|---|---|---|
| 4,213,058 | 7/1980 | Townsend | 307/40 |
| 4,333,002 | 6/1982 | Kozak | 219/483 |
| 4,419,590 | 12/1983 | Voss | 307/41 |

Primary Examiner—M. H. Paschall
Attorney, Agent, or Firm—Andrus, Sceales, Starke & Sawall

[57] ABSTRACT

A step controller for a water heater includes a plurality of individual electrical elements to maintain a predetermined minimum temperature in accordance with a sensed temperature signal and a preset desired temperature signal in combination with a dead band signal. The heating elements are turned "on" and "off" in a random sequence whenever a change is required, and in accordance with a binomial distribution so as to substantially equalize the operating period of the heating elements. The controller includes a microprocessor unit to periodically sense the signals of a sensor and a preset potentiometer, and also operates to store the on-off status of the heating elements, each of which is assigned a binary load indentifying number. The microprocessor includes a psuedo-random binary number generator for generating the load identifying numbers. The generator generates numbers in a pattern which closely approximates a binomial distribution and therefore a statistical "random" selection which over any reasonable selection period, each of the numbers will be created on equal number of times. Upon a demand to increase or decrease the number of "on" heating elements, a random code number is generated, and if such load is available it is actuated. If not, a new code is generated until an anvailable heating element is located and it is then properly operated.

13 Claims, 5 Drawing Figures

Microfiche Appendix Included
(1 Microfiche, 32 Pages)

FIG.1

MULTIPLE LOAD CONTROL APPARATUS WITH LOAD EQUALIZATION

BACKGROUND OF THE INVENTION

Reference is hereby made to the Microfiche Appendix "A" forming a portion of this specification and containing 1 microfiche and a total of 32 frames.

This invention is directed to a multiple device control apparatus for a multiple inputted load apparatus and particularly to a step-type controller for a water heater or like load means having a plurality of selectively actuated heating elements.

Multiple input apparatus may include a plurality of individual actuated load inputs for controlling the state of or conditioning the load apparatus by sequential and selective actuation of such plurality of inputs. For example, water heating apparatus may be constructed with a plurality of individual heating elements or units rather than one single modulated element for varying the thermal energy inputted into the stored water. The heat input may be conveniently controlled by varying of the number of the heating elements which are activated at any given time. The actuation of the heating elements may be varied depending upon the temperature of the stored water, the time of day, the anticipated usage, the recovery rate requirements and any other factor or condition which can effect the heat input requirement. In such a system, it may be desirable to provide for particular types of sequential operations of the load devices. This in turn requires proper sensing and monitoring of status of all such load input devices as well as the various control factors, and then controlling the load or element activations in accordance with the predetermined relative sensed and monitored conditions.

A step-type controller for a load having a plurality of individual inputs which are to be individually and separately activated in a predetermined sequence based on a plurality of different load and operating factors is shown in the recently issued U.S. Pat. No. 4,333,002 of the one inventor. The controller includes a microprocessor unit coupled to periodically sense the conditions of the sensors and signal sources as well as monitoring and storing the on-off status of each of the heating elements. The historical sequence of when each heating element was turned on or off in relationship to all of the other heating elements is particularly monitored. The microprocessor periodically updates the status by processing of the last read and stored signals to develop the difference between the actual and desired water temperatures, dividing the same by the span setting signal to provide for a predetermined acceptable variation and adding a constant to produce a number corresponding to the number of elements which should be in an activated state for that condition. Such number is compared with the actual number of elements then on, and if there are any deviations, appropriate control signals are generated to increase or decrease the number of activated elements to the predetermined and preset number for that temperature condition. The logic unit can readily store the sequence of the first on and the first off heating element and when required turn off the load which was first on, and turn on the load element which was the first off.

SUMMARY OF THE INVENTION

The present invention is particularly directed to a step controller for a multiple load device wherein the several individual loads are activated in a randomly selected manner, such that over any reasonable period of time, statistically effective equalization of the load system is obtained. In a particular and practical implementation of the present invention, the several loads are each identified by a unique code. A random selection code signal generator is provided to generate said codes in accordance with a binominal distribution. Upon demand of either turn-off or turn-on of a load, the signal generator provides a randomly generated code for one of said loads. That code is then compared with the codes of all then available loads in corresponding state and if available for related activation the corresponding load is activated. If it is not available, the code generator is signalled to generate a new code in accordance with the random sequence, and the cycle is repeated until such time as an appropriate load is found and correspondingly activated.

More particularly, in a preferred and unique embodiment of the present invention as applied to a water heater system having a plurality of water heating means, a demand sensor is coupled to the water heater and provides a signal proportional to the relative temperature of the stored water. A control means is coupled to the demand sensor to signal a random number signal generator means upon a demand for turn-on or turn-off of a heating means and responds by energizing or de-energizing a heating means in proportion to the demand level of the demand signal. The control means in one embodiment includes a suitable microprocessor having a programmed code signal generator. The microprocessor of course records and maintains a record within the microprocessor random memory of the "on" and "off" loads. Each load is identified by a unique digital code. Upon receipt of a demand signal, the random code generator program is activated to generate a code number identifying one of the load means. The random number generator used to select the next load to be turned "on" or "off" is a psuedo-random number generator. The random bit pattern from which the random number is generated closely approximates a binomial distribution and therefore meets the criterial for randomness. Over a period of time, the probability of selecting each load an equal number of times is the greatest. Therefore, the system will tend to equalize the energized time of all the heating elements. Thus, the code number is compared with the code numbers of the already activated loads. If the comparison indicates the load is already activated, the microprocessor signals the code generator to generate a new and different code in a random manner. The new code is again compared and assuming that the load is not operating the microprocessor proceeds to activate that load. The microprocessor continues to process the signals as long as a demand signal for additional heating continues and the random code generator is activated to generate appropriate identifying codes until the proper desired loads are turned on to match the demand exists. The turn-off of the system operates essentially in the same sequence, with the comparison being made with the then activated loads and therefore available loads for turn-off.

The present invention permits controlling a multiple load device such as a water heater or other similar device in accordance with individual customer demand with a highly effective equalization of the effective operation of the loads.

DESCRIPTION OF THE DRAWING FIGURES

The drawings furnished herewith illustrates a preferred construction of the present invention in which the above advantages and features are clearly disclosed as well as others which will be readily understood from the following description.

FIG. 1 is a diagrammatic illustration of a water heater unit incorporating a controller constructed with the teaching of the present invention.

FIGS. 2-4 detail a flow chart of the control process.

DESCRIPTION OF THE ILLUSTRATED EMBODIMENT

Figure 1:
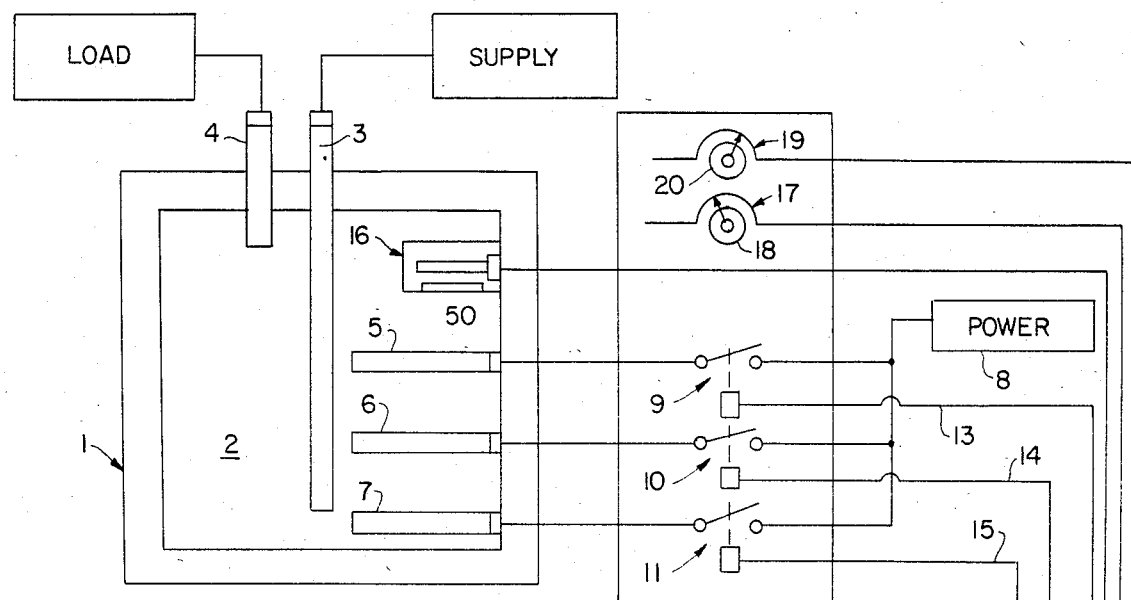
Figure 1:
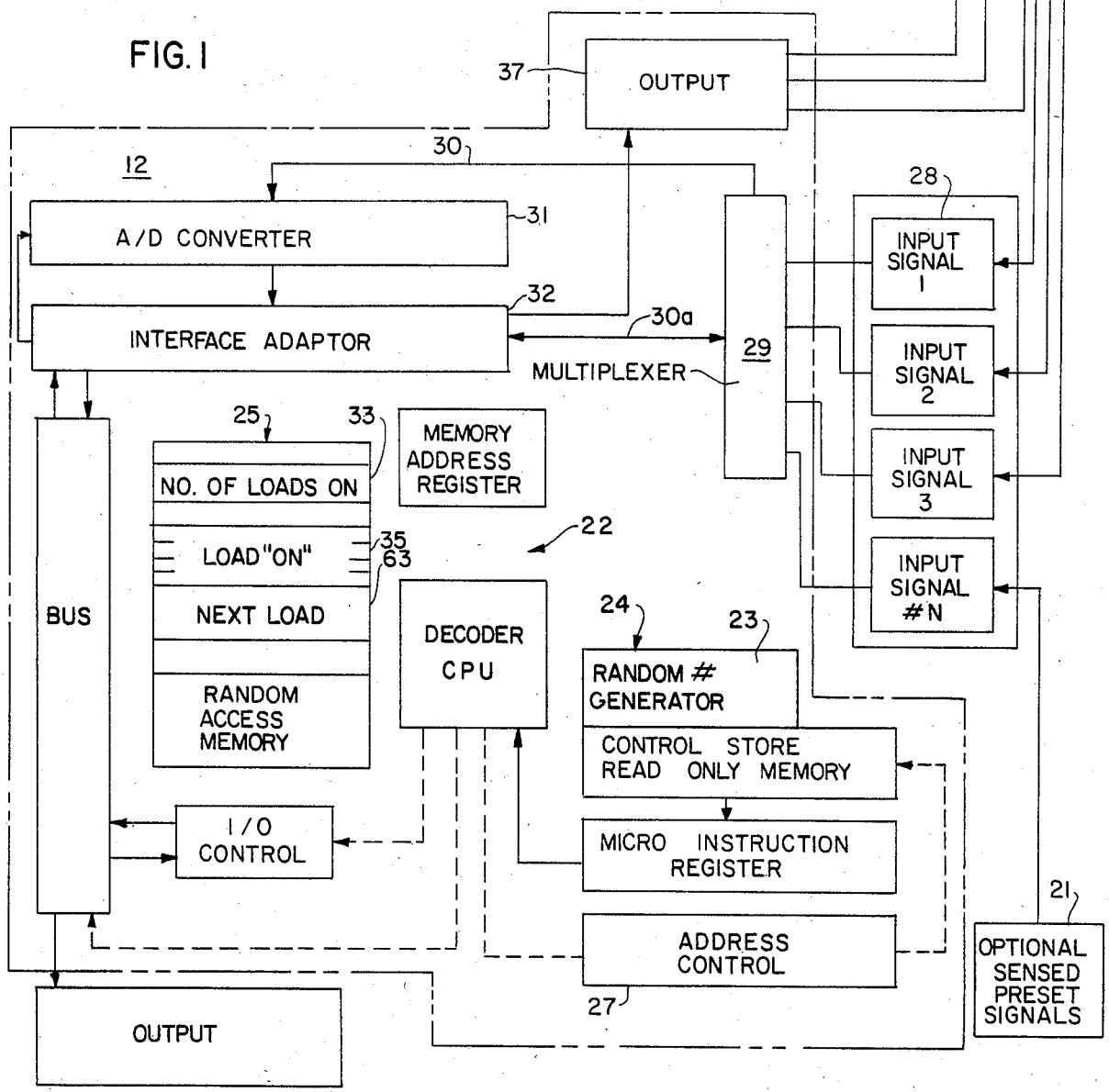

Referring to FIG. 1, a water storage unit is shown including an insulated tank 1 filled with water 2. A supply inlet 3 is connected to the storage tank 1 from any suitable source, not shown, and an outlet 4 is shown for distributing of the water to the home or other consuming device. In the illustrated embodiment of the invention, three separate electrical immersion heating units 5, 6 and 7 are shown secured to the wall of the storage tank 1 extending into the water. Three heating units are shown, but a substantially greater number may of course be used in any given application. The heating units 5-7 are connected to a suitable electrical source of power, shown generally at 8. The heating units 5, 6 and 7 are individually and separately connected to such power supply 8, and in the illustrated embodiment of the invention, are connected thereto by suitable separate activators, shown as electromagnetically actuated connectors or switches 9, 10 and 11. The switches 9-11 are adapted to be selectively activated by a controller 12 which is shown having three individual outputs 13, 14, and 15 coupled respectively to the switches 9-11. The controller 12 is a microprocessor based controller which is uniquely adapted to selectively activate the individual outputs 13-15 in an appropriate random sequence based on the demand condition of the hot water. The microprocessor based controller in accordance with this invention includes a random code generator adapted to generate a load identifying number based upon statistical randomness criteria so as to produce a substantially equalized operation of the heating units 5-7, inclusive. Thus, as more fully developed hereinafter, whenever a unit 5-7 is to be energized, or de-energized, the particular available unit is selected in a statistical random manner such that over any given significant operating period, all loads will be energized for essentially the same period.

In the illustrated embodiment of the invention, the demand signals are generated as in the previously identified U.S. Pat. No. 4,333,002. Thus, a temperature sensor 16, such as a well known thermister probe, is coupled to the storage tank 1 to sense the temperature of such water. Sensor 16 develops an electrical condition signal proportional to the temperature of the water 2. The sensor 16 is connected as one input to the controller 12. In addition, a set point signal generator or unit 17 is provided for generating a related set point signal corresponding to the desired temperature. A suitable manual dial 18 is provided for adjusting the setting of set point unit 17. The set point unit may be the well known potentiometer having an adjustable contact coupled to the dial 18. A span adjustment unit 19 provides a similar signal source for producing a differential temperature setting span or dead band signal. The span adjustment unit 19 includes its own separate control 20 for adjustment of a related electrical signal connected to the controller 12. The span signal requires a selected minimum difference in the present temperature and the actual temperature before a change in the number of heating elements activated or de-activated is made. In addition, other monitored states may be inputted through one or more auxiliary controller inputs 21. Such optional inputs might, as more fully set forth in the previously identified patent, include time of day, anticipate temperature changes, water usage, outdoor temperature, or any other conditions which would be a factor in determining the particular number of heating elements 5-7 to be activated. These and other similar inputs depending upon predetermined calculated conditions, sensed conditions or the like, can also all be readily incorporated into the logic control of the sequence controller for any load in this invention.

In the illustrated embodiment of the invention, the controller 12 includes a microprocessor 22 coupled to the individual signal sources including sensor 16 and preset temperature and span potentiometers 17 and 19. The microprocessor 22 is operable to continuously monitor, and record the corresponding input signals in appropriate form for logical processing. Further, in accordance with the present embodiment, the microprocessor 22 includes a random load number generator program 23 in a ROM memory 24. The microprocessor 22 may of course be conveniently located with respect to the storage tank 1 with appropriate access to an operator for adjustment of the various manually operable inputs.

The microprocessor 22 is typically shown, as will be readily understood by those skilled in the art, in a functional block diagram in which the data storing and processing are controlled by an internal control unit with the sequential sampling, processing and storing of the temperature and related data. The system includes a ROM memory unit 24 for controlling of the logical and sequential inputting data, processing such data, storing such processed data and outputting of appropriate signals to activate the outputs lines 13-15 and thereby control energizing heating elements 5, 6 and 7. The ROM memory unit 24 further includes the random number generator 23 which provides the unique system operation. A RAM memory section 25 is provided for appropriate storing of data. Data is introduced and outputted through a suitable I/O unit 26 which is connected to the external system by the common bus structure 26a. The routing is controlled by appropriate addressing and decoder unit 27, all under the control of the basic program stored in ROM memory 24. The microprocessor 22 of course includes the necessary arithematic and logic processing units which operate on the collected data and stored data in accordance with specific instructions contained within the memory control unit 18.

The microprocessor in particular is programmed to sequentially read the condition sensor and other input units, relate such signals to each other at any given time to develop an energy consumption or demand signal. If a change in the number of elements 5, 6 and 7 is recorded, the microprocessor 22 is signalled to execute the random load number generator program to appropriately actuate the selected ones of elements 5, 6 and 7 in a sequence.

The microprocessor 22 thus operates to periodically sample each of the sensor 16 and the input units 17 and 19 in a continuous cyclical manner, thereby continuously updating the record of the existing water temperature and the desired temperature. This information is directly stored within the microprocessor after appropriate processing, which may include appropriate weighting for various factors.

The difference between the actual and the desired temperature determines the number of elements 5, 6 and 7 which are to be energized. The microprocessor 12 further functions to energize the appropriate number of elements and to actuate them in a random sequence.

For example, a microprocessor manufactured and/or sold by Intel Corporation and identified as an Intel 8035 may be used. The operation and specific connection will be made depending upon the particular microprocessor 22 and will be readily understood by those skilled in the art particularly when taken with the flow chart attached hereto, and the program listing in the attached appendix "A" which provides one sequence for the outputting data based on the input devices as well as the necessary processing and storage of signals based on the combination of input signals and the historical signals.

More particularly, the sensor 16 and input devices 17 and 19 for the water heater are similarly connected by individual signal conditioning devices 28 to the input side of a multiplexer 27 having a common output line 30. The multiplexer 29 sequentially and cylically operates to couple one of the conditioning device 28 at a time to the output line 30 to transmit the corresponding temperature or other related signal under a processor control signal connection shown schematically by line 30a. The multiplexed inputs are analog signals. An analog-to-digital convertor 31 is connected to the output of the multiplexer 29 and is operable to convert each of the analog signals into an appropriate digital signal for processing by the digital microprocessor 22. A peripheral interface adaptor 32 of any suitable construction is provided for coupling of the digital signals to the microprocessor 22, via bus 26a. The interface adaptor 32 functions in a well known manner as a gating device coupled to the common bus for establishing two-way communication between the temperature input section and the microprocessor 9 which permits transmitting of the processed signals, transmitting appropriate timing signals to the multiplexer and the like. The rate of sampling is controlled by a suitable timing means which may be directly derived or controlled by the microprocessor 9 in any suitable well known manner.

The adaptor 32 thus responds to signals from the processor 22 to transmit the signals to the multiplexer 29 and to the A/D converter 31 and thereby provide for reading the several inputs, converting such readings and transmitting the same to the microprocessor RAM memory 25. In addition, the microprocessor RAM memory has an appropriate storage section 33 in which the operating status of each of the heating elements 5, 6 and 7 is stored. The processor thus stores in a first location 34 in memory the number of all loads or elements 5, 6 and 7 which are energized and conversely those which are off. Additionally, the memory stores the status of each load in section 35 such that it can be compared with the random generated code to determine whether it is available for actuation in accordance with a demand change.

The output from the microprocessor 22 is coupled by an output signal conditioner 37 which includes a suitable signal converter such as an RS232C converter to transmit suitable analog signals to the appropriate electromagnetic unit 9-11.

In operation, the microprocessor based controller 12 continuously monitors the input data on a periodic basis. The several analog input signals from the sensor 16 and from the presettable input signal sources 17 and 19 are time multiplexed to the A/D converter 31 and the appropriate digital representation stored in the computer data RAM memory 25. The program is a periodically activated and for example, as shown in flow chart attached hereto, operates on the last stored signals to determine the number of elements 5, 6 and 7 which should then be operating based on the stored data. In particular, the microprocessor 22 determines the difference between the water temperature and the temperature setting as recorded in the data memory, and divides such difference by the span setting to determine whether or not the differential exceeds the acceptable difference. A constant is added to produce a condition number indicative of the number of elements to be then operating. The final condition number is then compared with the existing number of elements 5, 6 and 7 then in the "on" state, as stored in the microprocessor memory 25. If the numbers agree, no action is required and the microprocessor 22 returns to other normal task until the next period required for updating of the load status. If a difference exists, the appropriate heating element 5, 6 or 7 is turned on, or off, in a proper random sequence.

Thus, if the number differs and indicates more elements should be operating, the microprocessor 22 continues to process the data, and the random number program 23 is executed to produce a load number. If the random number generated corresponds to a load number which is already energized, another random number is generated. This continues until the random number generated corresponds to a de-energized element. The microprocessor 22 then generates an output to that load line 13, 14, or 15 to turn on the corresponding heating element 5, 6 or 7. If conversely the comparison indicates that an element should be turned off, the processor 22 executes the random number program to produce a load number. If the random number generated corresponds to a load number which is already de-energized, another random number is generated. This continues until the random number generated corresponds to an energized element. After such determination, the processor 22 deactivates the signal line 13, 14 or 15 for such element resulting in turn off of the corresponding element.

After turning "on" or "off" of an element or elements, the microprocessor 22 returns to other normal tasks until the next sampling and updating of the status of energization of the elements. The processor of course updates the status storage sections 33 of memory unit 25 for proper processing and subsequent control of the energization elements 5-7.

As noted previously, any other plurality of input options can be multiplexed into the unit to provide for a desired operating sequence and control. The system may also provide for additional logical factors for controlling the operating sequence and activation of the individual elements without a significant change in the system controller. The several elements may, for example, have certain different characteristics which may be used to change the sequence. Such information can of course be readily stored within the microprocessor unit by inputting of the corresponding load characteristic into the system design.

The attached FIGS. 2-5 details one sequence of the logic system and includes all significant steps to the various usual subroutines, such as those providing for mathematical calculations such as multiplication and division as well as various timing which might be provided. The mathematics subroutines have not been included because they are of a general known sequence and can be readily provided by those skilled in the art. The program listing of Exhibit A is complete for a five step controller having a two port microprocessor and for a forty to one hundred and forty degree Fahrenheit range. The listing will be readily followed and understood by those skilled in the art, particularly in view of the illustrated embodiment and above description, and is only briefly summarized herein.

Figure 2:
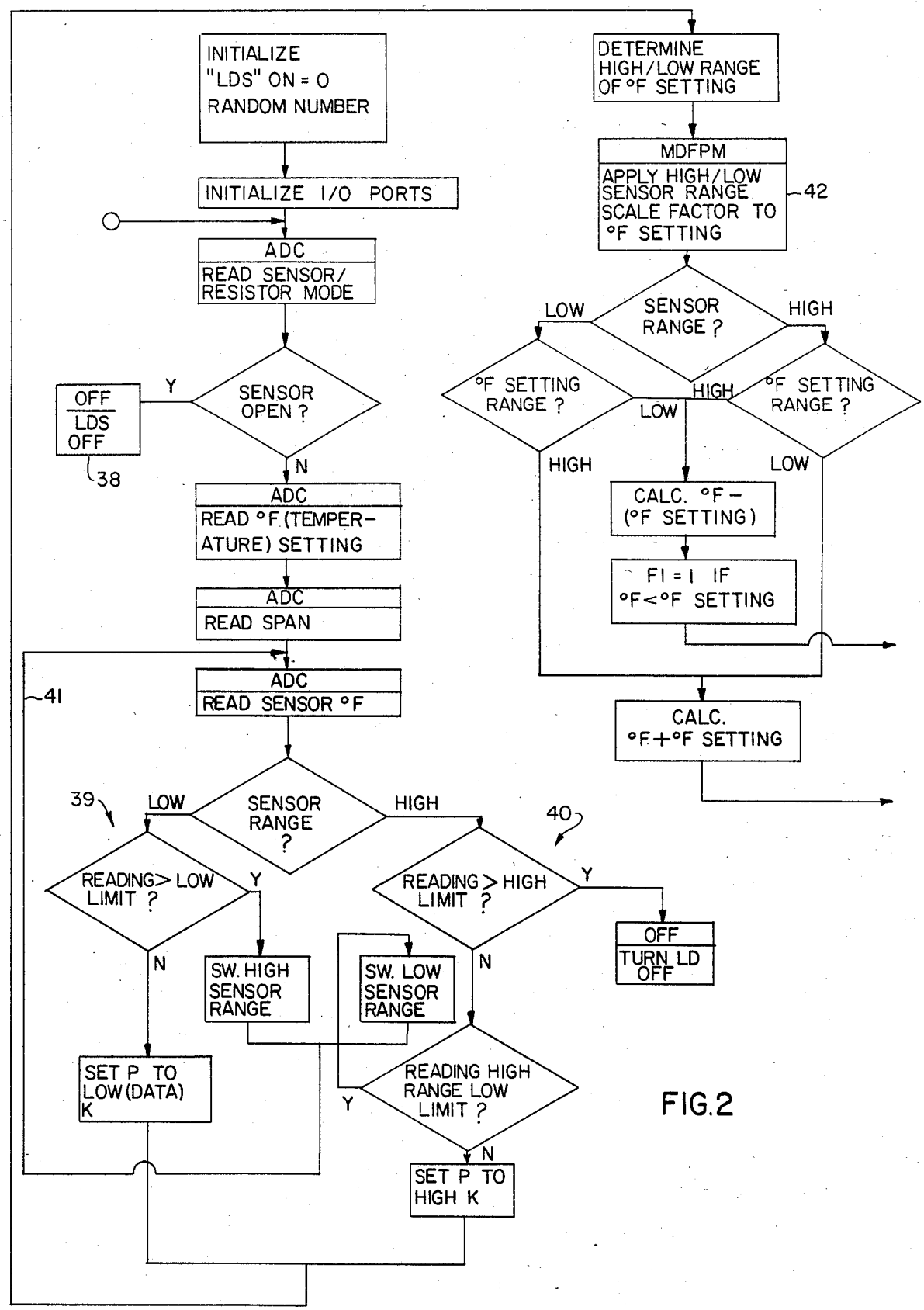

Referring to the attached program flow chart, the main program is shown in FIG. 2 and includes the usual initialization of the system for reading and conversion of the analog input signals to appropriate digital form. If the sensor connection is open circuited, the loads are automatically turned off, as noted at 38. If not, the program proceeds to read and store the temperature setting, the span dial setting, and the thermister temperatures.

The illustrated system is set for controlling the water within selected ranges and the program establishes the appropriate temperature range scale factors as in the inventors' previously identified patent. The program flow chart diagrams the range switching which is of course produced by the necessary hardware and software in the controller 40 degrees to 140 degrees F. range which includes a low range section from 40 degrees to 90 degrees F. and a high range section from 90 degrees to 140 degrees F.

Figure 3:
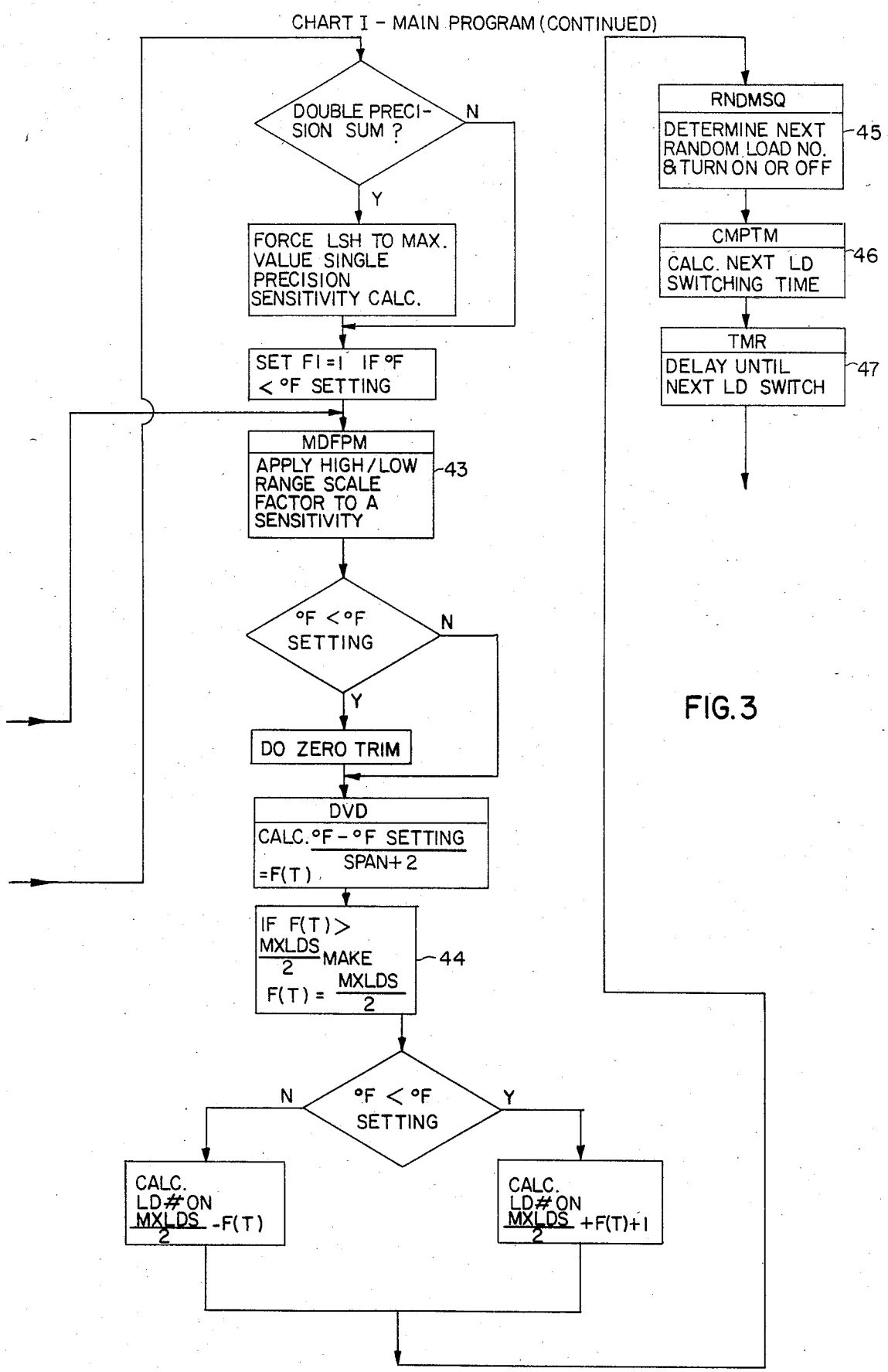

Thus, as shown in FIGS. 2 and 3, depending which range is employed, the signal is processed through an appropriate channel 39 or 40 with the appropriate data. For example, if the reading exceeds the low range section for the particular range, the system switches to the opposite high range section and is fed back into the system to again read the thermister temperature, as at 41. The signal is thereby processed through the appropriate range channel by pointing to the appropriate data constants, and setting an appropriate signal to apply the proper scale factor to the temperature setting in a multiplied data from program memory unit, as at 42. The modified sensor signal is then processed and compared to the temperature setting and the scale factor applied to the sensitivity setting, as at 43. The load calculation is then made based upon the difference between the actual temperature and the temperature setting divided by the sensitivity plus a load control factor, which is shown in the flow chart as a factor of two. This provides an algorithm function identifying the number of loads which should be on, or off, for that condition. The calculated value is compared to the number of loads on and off to establish data signal for the number of loads to be turned on or off, as at 44. The signal is processed to calculate the number of loads on or off, depending upon whether the temperature of the sensor is greater or less than the temperature setting. If the actual temperature is greater than the temperature setting, the number of loads on are calculated by the difference of the maximum number of loads factor minus the function value from the previous calculation. If the temperature is less than the temperature setting, a calculation for the number of loads on is made by adding of the maximum load factor, the previously calculated function valve plus one. In either of the programmed sequences, the calculated value is applied to a random sequence load selection subroutine 45 which is operable to randomly select the next available (that is, a load in an opposite state) load to be turned on or off, as noted in FIG. 4.

The load change output therefrom is then preferably applied to a switching time sequence 46 (FIG. 5) to calculate the optimum time for the next load switching, the output of which is applied to an appropriate timer subroutine 47 to delay the actual switching until the desired next load switching.

The sequence is then recycled as shown at 48.

Figures 4, 5:
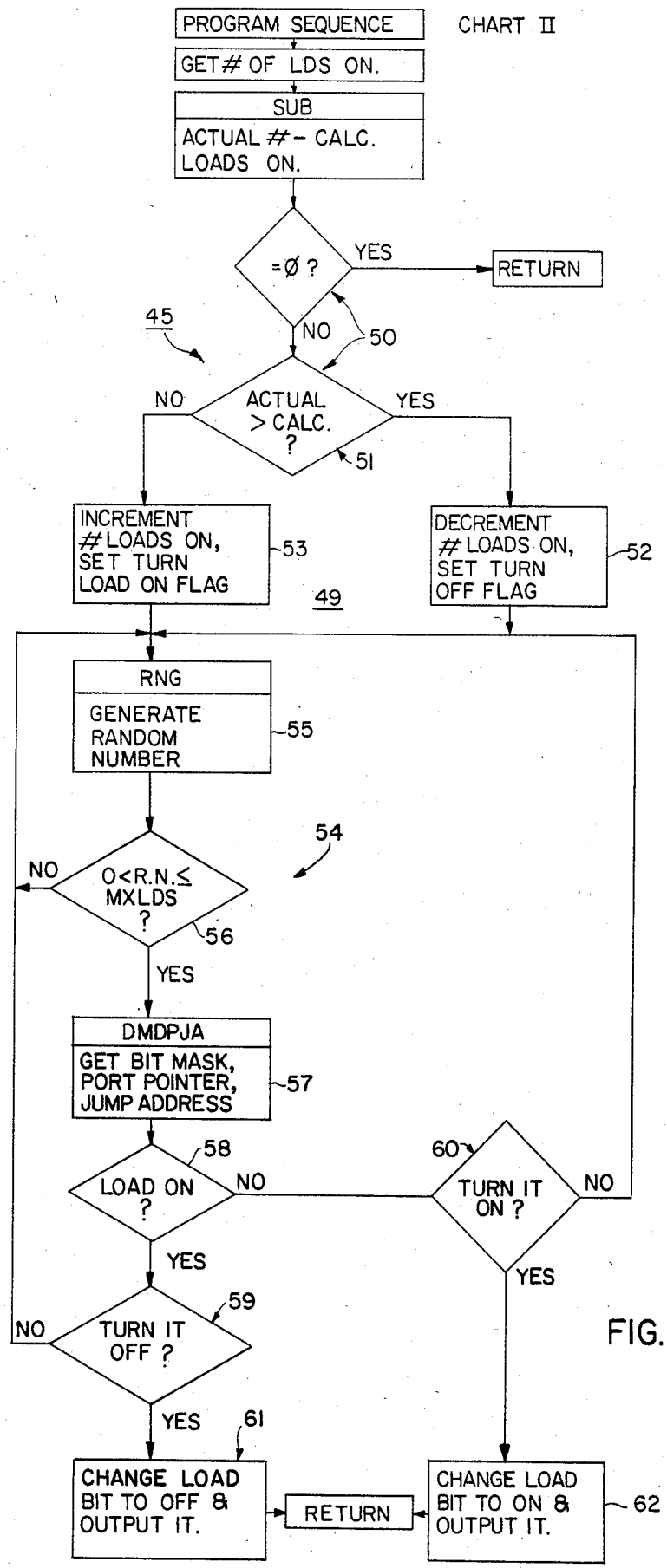

More particularly, one program sequence subroutine 45 is shown in FIG. 4 with the appropriate processing of the signals for a two port processor unit. If a processor with a greater number of ports is used, a table could be provided for selection of the appropriate port.

The subroutine 45 determines the number of loads and compares the calculated number to be on, and if they are not equal, jumps to a subroutine 49 to locate in a random selection the next available load to be turned on or off. As shown in FIG. 4, the actual demand determination 50 generates either a (1) signal that the load set is proper and the microprocessor returns to other processing, or (2) that the load set is improper and a "turn-on" or "turn-off" is required, in which events the program continues to determine which of the latter, as at 51. Thus, if the actual "on" member is greater than the calculated, a load should be turned off and the program proceeds to set a turn-off flag, as shown at 52. Conversely, if the actual "on" number is less than the calculated, a load should be turned on and the program proceeds to set a turn-on flag, as shown at 53. When either flag is set, the program execution proceeds with the same sequence, as shown at 54. This latter particular processing includes reading the random number generator to generate a random number identifying a load, as at 55. If the selected load is to be turned "on" or "off," the microprocessor then proceeds to generate a random number, and check to determine whether the number is a load identifying number. If the number is not, the generator is actuated to generate a new number and if the number is within the limit, the program steps the sequence to the selected load (57) and determines whether it is "on," as at 58, and then checks to see if the reverse state should be created, as shown at 59 and 60. If a proper number, the number is thus processed to determine whether that encoded load is already "on," which of course identifies whether it is available for the one demand or the other. If the "off" flag was set, as at 52, the related load bit or signal is changed accordingly, and the signal is outputted to turn off such load, as shown at 61. If the "on" flag was set at 53, the load is not available and the random number generator is actuated and a new number is generated and processed through the load "on" state to locate a load that is "off." That "off" load is then processes at 60 through the program to change its load bit to "on" and the signal outputted to turn "on" such load, as shown at 62. The load(s) to be turned on or off is thus determined and such data stored in the memory, as at 63. The program steps to the subroutine 46, shown in FIG. 5, for calculating a minimum switching time based on the magnitude of the difference in the temperature setting. The switching time signal is applied to a timer control subroutine 47. In this illustrated embodiment, a hardware timer is used and the time controlled through an interupt subroutine which can be readily provided by those skilled in the art. Generally, the time between switching of the loads on is related to the total temperature change to allow as rapid a control as permissible without adverse loading of the power system. A suitable minimum switch time sequence is shown in FIG. 5.

Obviously, in addition to such illustrated subroutines, other suitable or conventional subroutines are provided; for example, an off subroutine may be provided for turning off of all loads in the event of system malfunction; multiply divide and point subroutines are of course provided as well as an analog-to-digital conversion subroutine for use in the main and other subroutines.

This and similar detail can readily be provided and are not set forth to avoid undue polixity of the application. Appropriate listings are found in the program listing submitted with the application for file wrapper reference.

Other controls can be incorporated into the controller or system operation; such as a low water level cut off control or a timer security which ensures functioning of the processor with respect to the proper sequential execution of instructions, which can be incorporated herein in the same manner as fully set forth in the above patent. The above and similar additions to the basic structure can of course be readily provided by those skilled in the art.

The present invention provides a simplified controller for equalizing load operating devices while maintaining incorporation of the various basic control condition and related factors.

Various modes of carrying out the invention are contemplated as being within the scope of the following claims, particularly pointing out and distinctly claiming the subject matter which is regarded as the invention.

We claim:

1. In a load system having a plurality of loads adapted to be separately activated, comprising load control means, demand signal means for identifying the number of said loads to be activated and connected to said control means to control the state of said loads, means to monitor the state of each load and identify each "on" load, and wherein each of said loads being uniquely encoded within said load control means with a number code, a random code generator adapted to generate all of said codes and operable to randomly generate any one of said codes in response to receipt of a control signal, means to compare said randomly generated code with stored load identifying codes in said load control means for determining the availability of the load means for operation, and means for operating said available load and responding to non-availability of a load to activate said code generator to generate a new code whereby said load means are operated in response to said demand signal in a statistically random manner and thereby providing for substantial equalization of the operating life of the load means.

2. The load system of claim 1 wherein said random code generator produces a binominal distribution of the codes.

3. The load system of claim 1 or 2 including a microprocessor having a random code program defining said random signal generator and generating a set of numbers including said encoded number and other non-encoded numbers codes and means responsive to generation of a non-encoded number code to activate the code generator to generate a new encoded number code.

4. The load system of claim 1 or 2 including a microprocessor having a random code program defining said random signal generator, said program creating a random bit pattern which substantially approximates a binominal distribution and thereby defines random load binary numbers in accordance with statistical randomness.

5. A load control system for a plurality of loads, load control means including identifying control codes for operating said loads, a random code generator adapted to generate all of said codes and operable to randomly generate any one of said codes in response to receipt of a demand signal, means to compare said randomly generated code with said load identifying control codes for determining the availability of a load for operation, and means for operating said available load and responsing to non-availability of a load to activate said code generator to generate a new code whereby said load means are operated in response to said demand signal in a statistically random manner and thereby providing for substantial equalization of the operating life of the load.

6. The load system of claim 5 wherein said plurality of loads are separately activated, comprising means to monitor the state of each load, demand signal means for identifying the number of said loads to be activated and connected to said load control means to control the state of said loads, a microprocessor including a program defining said random code generator adapted to generate code numbers in a pattern which essentially corresponds to a binomial distribution to randomly generate said codes in response to receipt of said demand signal, said microprocessor being coupled to store the number of loads "on" and responsive to a demand signal to determine the loads to be turned on or off, and setting separate control signal means for turn "on" and for turn "off" of a load, said microprocessor being responsive to either of said control signal means to actuate said code generator to generate a code and to compare said randomly generated code with stored load identifying codes for determining the availability of the load for operation, and means for operating said available load and responding to non-availability of a load to activate said code generator to generate a new code whereby said loads are operated in response to said demand signal in a statistically random manner and thereby providing for substantial equalization of the operating life of the loads.

7. The load system of claim 6 wherein said code generator creates code numbers other than the load identifying code number, and said microprocessor sequentially actuates said code generator until a load identifying code number is generated.

8. The load system of claim 7 including means to actuate the loads in accordance with a selected minimum switching cycle.

9. A water heater apparatus comprising a water storage tank having a plurality of separate electrical heating means, a plurality of power supply connectors one for each of said heating means, sensor means for sensing the temperature of the water, temperature preset means for establishing a signal proportional to a predetermined desired temperature, status means to continuously record the number of heating means in operation, logic means for comparing the output of the sensor means and the preset means for controlling the number of activated heating means, and said logic means including monitor means connected to said heating means and said status means for monitoring which heating means is on and which heating means is off and establishing a separate bond identifying code for each of said heating means, selection means operable in response to a demand for changing the number of heating means in operation to randomly generate said load identifying codes to change the number of heating means in operation and operable to generate a new load code if the generated code cannot be used and thereby to randomly turn said heating means on and off from the available heating means and providing substantial equalization of the operating life of each heating means.

10. The water heater apparatus of claim 9 wherein said selection means is constructed and arranged to select said heating means in accordance with a binominal distribution.

11. The heater apparatus of claim 9 or 10 including a span adjustment means to establish a temperature differential in which said water temperature varies relative the preset temperature without changing said number of heating means.

12. A water heater apparatus comprising a water storage tank having a plurality of separate electrical heating means, a plurality of power supply connectors one for each of said heating means, sensor means for sensing the temperature of the water, temperature preset means for establishing a signal proportional to a predetermined desired temperature, status means to continuously record the number of heating means in operation, logic means establishing a demand signal for comparing the output of the sensor means and the preset means for controlling the number of activated heating means, said logic means including selection means operable to randomly turn said heating means on and off, and wherein said logic means is a microprocessor connected to read said sensor means and preset means and operable to identify the number of heating means to be "on," said microprocessor including a random access memory including said status means, said microprocessor including a program defining a random code generator adapted to generate code numbers in a pattern which essentially corresponds to a binomial distribution to randomly generate said codes in response to receipt of said demand signal, said microprocessor being coupled to store the number of heating means "on" and responsive to a demand signal to determine the heating means to be turned on or off and setting separate control signal means for turn "on" and for turn "off" of a heating means, said microprocessor being responsive to either of said control signal means to actuate said code generator to generate a code and to compare said randomly generated code with stored heating means identifying codes for determining the availability of the heating means for operation, and means for operating said available heating means and responding to nonavailability of a heating means to activate said code generator to generate a new code whereby said heating means are operated in response to said demand signal in a statistically random manner and thereby providing for substantial equalization of the operating life of the heating means.

13. The load system of claim 12 wherein said code generator creates code numbers other than the load identifying code number, and said microprocessor sequentially actuates said code generator until a load identifying code number is generated.

* * * * *